(12) United States Patent
Abbas

(10) Patent No.: US 11,265,384 B2
(45) Date of Patent: Mar. 1, 2022

(54) DEVICE-LEVEL NETWORK SWITCHING

(71) Applicant: Vitalchat, Inc., San Francisco, CA (US)

(72) Inventor: Ghafran Abbas, Ashburn, VA (US)

(73) Assignee: Vitalchat, Inc., Ashburn, VA (US)

( * ) Notice: Subject to any disclaimer, the term of this patent is extended or adjusted under 35 U.S.C. 154(b) by 15 days.

(21) Appl. No.: 16/892,526

(22) Filed: Jun. 4, 2020

(65) Prior Publication Data
US 2021/0385282 A1 Dec. 9, 2021

(51) Int. Cl.
*G06F 15/173* (2006.01)
*H04L 67/141* (2022.01)
*H04L 43/106* (2022.01)

(52) U.S. Cl.
CPC .......... *H04L 67/141* (2013.01); *H04L 43/106* (2013.01)

(58) Field of Classification Search
CPC ............................ H04L 67/141; H04L 43/106
See application file for complete search history.

(56) References Cited

U.S. PATENT DOCUMENTS

| | | | |
|---|---|---|---|
| 9,450,852 B1 * | 9/2016 | Chen | H04L 67/10 |
| 10,560,877 B2 | 2/2020 | Wong et al. | |
| 10,693,813 B1 * | 6/2020 | Jacob Da Silva | H04L 12/4625 |

OTHER PUBLICATIONS

What Is Adaptive Wi-Fi, Samsung Support Australia, https://www.samsung.com/au/support/mobile-devices/galaxy-note-8-what-is-adaptive-wifi/, downloaded Jun. 2, 2020, last modified Sep. 16, 2019, 3 pgs.
Auto Switch Between Network Adapters, https://superuser.com/questions/1393630/auto-switch-between-network-adapters, downloaded Jun. 2, 2020, 5 pgs.
Charles, Why Does My Computer Keep Switching to a Different Network? https://itstillworks.com/computer-keep-switching-different-network-12178571.html, downloaded Jun. 2, 2020, 3 pgs.
Is There a Device That Would Automatically Switch Between Two Internet Connections Whenever One of Them Goes Down? https://www.quora.com/Is-there-a-device-that-would-automatically-switch-between-two-internet-connections-whenever-one-of-them-goes-down.com, downloaded Jun. 2, 2020, 3 pgs.

* cited by examiner

*Primary Examiner* — Thanh T Nguyen
(74) *Attorney, Agent, or Firm* — Young Basile Hanlon & MacFarlane, P.C.

(57) ABSTRACT

A device that includes a processor and a plurality of network interfaces. The plurality of network interfaces include a first network interface and secondary network interfaces. The first network interface is a currently enabled network interface for connecting the device to a service. The secondary network interfaces are currently inactive interfaces for connecting the device to the service. The processor is configured to send a heartbeat request to a heartbeat responder via the first network interface; determine whether a response is received from the heartbeat responder to the heartbeat request; and, in response to determining that the response to the heartbeat request was not received, deactivate the first network interface, and set a second network interface of the secondary network interfaces as the currently enabled network interface for connecting the device to the service.

20 Claims, 5 Drawing Sheets

DEVICE-LEVEL NETWORK SWITCHING

CROSS-REFERENCE TO RELATED APPLICATION(S)

N/A.

TECHNICAL FIELD

This disclosure relates generally to device network connectivity and more specifically to device-level network switching.

BACKGROUND

The use for telehealth, telemonitoring, and/or televisits has been increasing and the need for such capabilities has increased especially in response to the COVID-19 pandemic. "Tele" in this context means "from a distance" or "remotely," and more specifically using telecommunication capabilities. Patient rooms may be equipped (in a fixed way or in a movable way) with a telecommunication device (i.e., a monitoring device) that enables telehealth, telemonitoring, and/or televisits. The monitoring device may enable audio and/or visual communication between a remote user (e.g., a physician, a family member, etc.) and an in-room person (e.g., the patient, a nurse, etc.).

SUMMARY

Disclosed herein are implementations of device-level network switching.

A first aspect of the disclosed implementations is a device that includes a processor and a plurality of network interfaces. The plurality of network interfaces include a first network interface and secondary network interfaces. The first network interface is a currently enabled network interface for connecting the device to a service. The secondary network interfaces are currently inactive interfaces for connecting the device to the service. The processor is configured to send a heartbeat request to a heartbeat responder via the first network interface; determine whether a response is received from the heartbeat responder to the heartbeat request; and, in response to determining that the response to the heartbeat request was not received, deactivate the first network interface, and set a second network interface of the secondary network interfaces as the currently enabled network interface for connecting the device to the service.

A second aspect is a method for connecting a device to a service. The method includes sending a heartbeat request to a heartbeat responder via the first network interface of the device, the device includes the first network interface and secondary network interfaces, the first network interface is a currently enabled network interface for connecting the device to a service, and the secondary network interfaces are currently inactive interfaces for connecting the device to the service; determining whether a response is received from the heartbeat responder to the heartbeat request; and, in response to determining that the response to the heartbeat request was not received, setting a second network interface of the secondary network interfaces as the currently enabled network interface for connecting the device to the service.

A third aspect is a non-transitory computer-readable storage medium that includes executable instructions that, when executed by a processor, facilitate performance of operations. The operations include sending a heartbeat request to a heartbeat responder via the first network interface of the device, the device includes the first network interface and secondary network interfaces, the first network interface is a currently enabled network interface for connecting the device to a service, and the secondary network interfaces are currently inactive interfaces for connecting the device to the service; determining whether a response is received from the heartbeat responder to the heartbeat request; and, in response to determining that the response to the heartbeat request was not received, setting a second network interface of the secondary network interfaces as the currently enabled network interface for connecting the device to the service.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Figure 1:
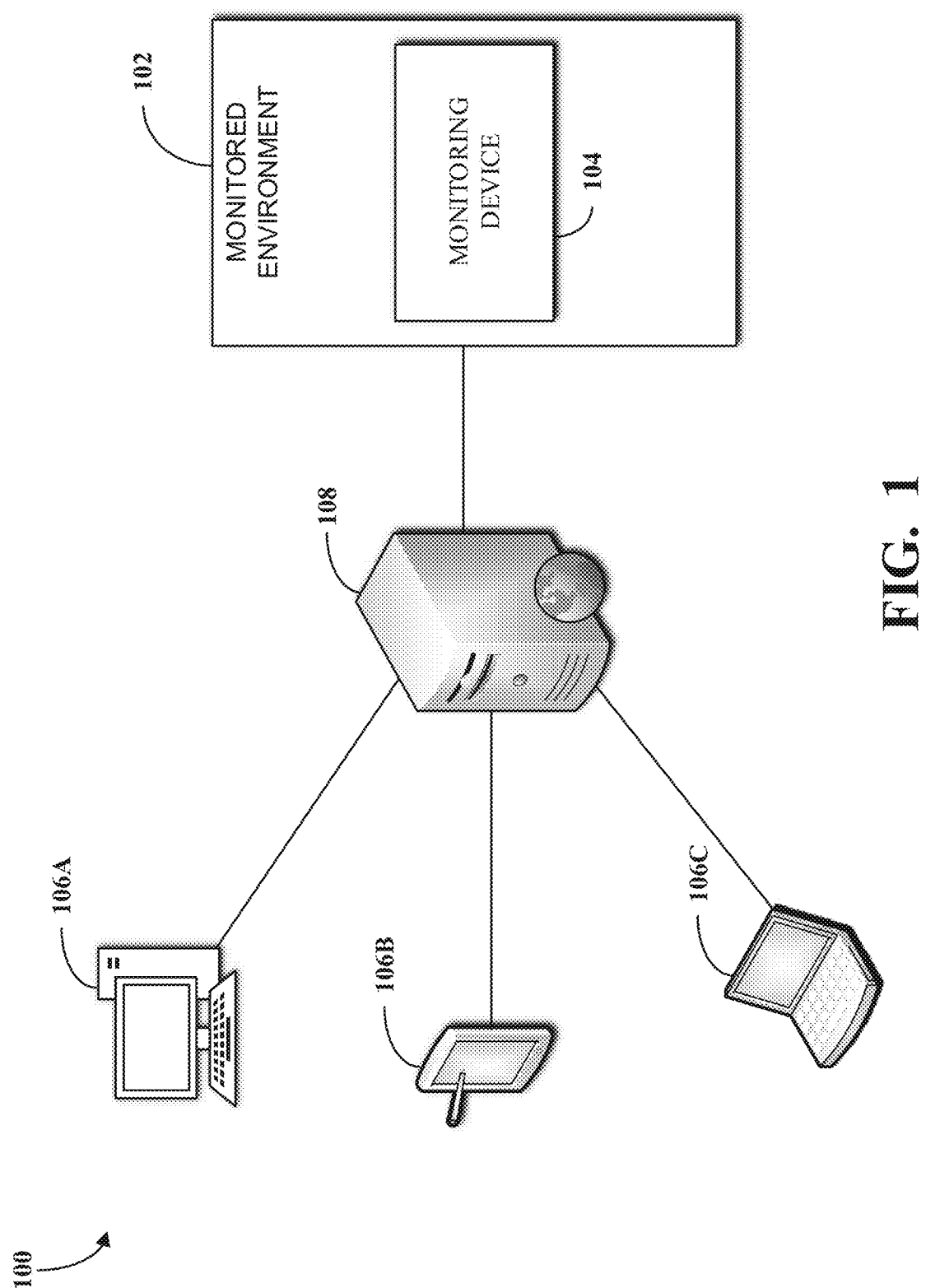
FIG. 1 is an schematic of an example of a system 100 according to implementations of this disclosure.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using a suitable apparatus, which may take the form of programmable computers running computer programs arranged to implement the methods and/or techniques disclosed herein. Aspects can be combined such that features described in the context of one aspect may be implemented in another aspect.

DETAILED DESCRIPTION

In some environments, device connectivity (such as to a network) may be a challenge. More specifically, connecting to (e.g., accessing, etc.) devices in such environments may be related to network Wi-Fi issues, unavailability of bandwidth, or other issues.

Some devices may implement auto-switching between network interfaces (e.g., network adapters). For example, when a local wired connection is available on a device, the wired connection is used first; and when the wired connection is not available and a wireless connection is available, the device is automatically switched to the wireless connection to access a network.

In another example, if two networks in a wireless network list of a device are in the same physical location, the device may be configured to switch from one frequency to another frequently in an attempt to remain connected to the local network with the strongest signal.

However, such switching does not guarantee that the device can access or can be accessed from a service, such as a service that may be available over the Internet. This is so because, for example, while the device may have a strong and stable connection to a local router, the router itself may have connectivity problems to the Internet.

In some applications, it is essential that the monitoring device be reliably connected to a network so that it can at least be reachable on demand from other devices.

A monitoring device, which may include a camera and/or video and audio conferencing capabilities, may be used to monitor (e.g., view) a monitored environment. A view, as seen by the camera, of the monitored environment can be displayed on a display device (e.g., a screen, etc.) of a user, who may be controlling the camera. The user can change at least one of a pan configuration, tilt configuration, and/or zoom configuration (collectively, a PTZ configuration) of the camera to change the view of the monitored environment that is displayed on the user device.

For example, in a telehealth application, a physician may be remotely monitoring a patient via a camera that is positioned in the patient's room. The physician may be communicating with the patient or another person in the patient's room during a televisit. The physician may zoom in and out on the patient's face and also pan the camera to a family member of the patient, who is also in the room, to make a comment to, or carry a discussion with, the family member. In another example, the physician may have been called to diagnose a patient emergency. The patient may be currently having a stroke.

It would be critical for the physician to be able to connect, on-demand, to the monitoring device. As such, it is critical that the monitoring device is always (or, nearly always) accessible. Implementations according to this disclosure can ensure that a device, such as a monitoring device, continuously monitors accessibility to a service from a device and to perform network switching at the device so that the service is always available. The service may not be available only during the time of network switching, when network switching is necessary because the service is not available.

Details of device-level network switching are described herein with initial reference to a system in which the teachings herein can be implemented.

FIG. 1 is an schematic of an example of a system 100 according to implementations of this disclosure. The system 100 includes a monitored environment 102, a monitoring device 104, a user device 106, and a server 108.

The monitored environment 102 can be a patient hospital room, a nursing home room, a room of a home patient, a manufacturing line, a workstation, a laboratory, and the like. The monitored environment 102 includes and/or can be viewed using the monitoring device 104. The monitored environment 102 can be remotely monitored from the user device 106. The user device 106 can be one or more of a desktop computer 106A, a mobile device 106B (such as tablet, a smart phone, and the like), a laptop computer 106C, or some other device that can be used to access, communicate with, and/or control (directly or indirectly) the monitoring device 104. A user (not shown) of the user device 106 can monitor the monitored environment 102 via the monitoring device 104. That the monitored environment 102 is remotely monitored by the user means that the user may not physically be in the monitored environment 102 while performing the monitoring.

In the case that the monitored environment 102 is a patient hospital room, the user can be a physician, a nurse, another health-care practitioner, a family member of the patient, and/or the like. For example, the physician may be remotely responding to (e.g., diagnosing, mitigating, assessing, etc.) a patient emergency or remotely performing patient rounds. The nurse may be monitoring patients, including the monitored environment 102 from a nurses station to, for example, ensure that no patient is falling, is in need of help, is distressed, and/or the like. The family member of the patient may remotely visit with the patient using the monitoring device 104.

The monitoring device 104 can be configured to and/or used to capture video, images, audio, environmental conditions, or other characteristics of the monitored environment. The characteristics of the monitored environment can be transmitted to one or more users of the user devices 106. Via the user device 106, the user can interact with the monitoring device, such as by sending and/or receiving captured video and/or audio, sending commands to the monitoring device 104, and the like.

The user device 106 and the monitoring device 104 can communicate via the server 108. For example, the user device 106 can send commands to the server 108, which relays the command to the monitoring device. Similarly, the monitoring device 104 can send information to the server 108, which relays the information to the user device 106.

To illustrate, the monitoring device 104 can include a camera that is configured to view the monitored environment 102. The user device 106 can issue a request to the server 108 to establish a connection with the monitoring device 104. The server 108 can establish the connection. Issuing a request to the server 108 to establish a connection can include, for example, the user device 106 connecting to a patient by the patient's room number or name; the server 108 determining the monitoring device 104 of the patient (i.e., the monitoring device that is in the patient's room); and the server 108 connecting the user device 106 and the monitoring device 104. The connection session may be an video communication session during which the user can communicate visually and/or verbally with a person in the patient's room. The user device 106, may during the connection session, send a pan, tilt, or zoom (PTZ) command to the camera of the monitoring device 104 via the server 108. The monitoring device 104 can update the view of the monitored environment according to the PTZ command and send back, via the server 108, a video and/or image of the updated view of the monitored environment, which can then be displayed on a display of the user device 106. In an example, the server 108 can allow certain users to control monitoring device and not allowing other user devices to control the monitoring device.

In another example (not shown), the user device 106 can establish a peer-to-peer communication channel with the monitoring device 104. For example, in response to the connection request, the server 108 can facilitate the establishment of the peer-to-peer (e.g., direct) communication between the user device 106 and the monitoring device 104.

The server 108 can be deployed (e.g., physically located) on premise at the location of the monitored environment. The server 108 can be deployed on a same local area network (LAN) of the monitoring device 104. The server 108 can be deployed on a same wide area network (WAN) of the monitoring device 104. The server 108 can be a cloud-based server. Other deployments of the server 108 are possible.

The monitoring device 104, the user device 106, and the server 108 can communicate over any suitable network. The network (not shown) can be, for example, the Internet or an Internet Protocol (IP) network, such as the World Wide Web. The network can be a LAN, a WAN, a virtual private network (VPN), cellular telephone network, a private network, an extranet, an intranet, any other means of transferring information (e.g., video streams, audio streams, images, other information), or a combination thereof from one end point to another end point.

In an example, the user device 106 and the monitoring device 104 may communicate using a real-time transport protocol (RTP) for transmission of the media content, which may be encoded, over the network. In another implementation, a transport protocol other than RTP may be used (e.g., a Hypertext Transfer Protocol-based (HTTP-based) streaming protocol). For example, the user device 106 can transmit and/or receive media content (e.g., audio and/or video content) to and/or from the monitoring device 104 via WebRTC, which provides web browsers and mobile applications with real-time communication. However, the disclosure herein is not so limited and any other real-time transmission protocol can be used.

Figure 2:
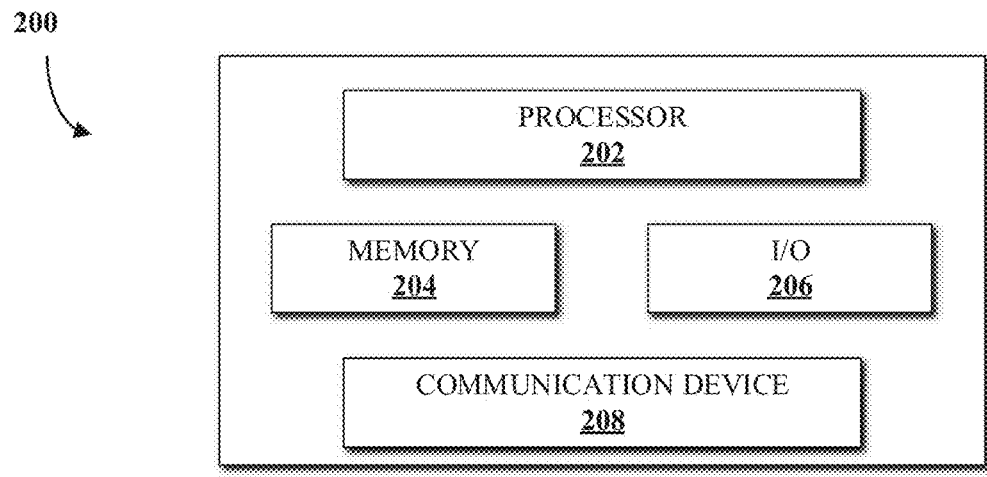
FIG. 2 is a block diagram of an example of a computing device 200.

FIG. 2 is a block diagram of an example of a computing device 200. Each of the monitoring device 104, the user device 106, or the server 108 can be implemented, at least partially, by the computing device 200.

The computing device 200 can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The computing device 200 can have an internal configuration of hardware including a processor 202 and a memory 204. The processor 202 can be any type of device or devices capable of manipulating or processing information. In some implementations, the processor 202 can include a central processor (e.g., a central processing unit or CPU). In some implementations, the processor 202 can include a graphics processor (e.g., a graphics processing unit or GPU). Although the examples herein can be practiced with a single processor as shown, advantages in speed and efficiency can be achieved by using more than one processor. For example, the processor 202 can be distributed across multiple machines or devices (each machine or device having one or more processors) that can be coupled directly or connected via a network (e.g., a local area network). The memory 204 can include any transitory or non-transitory device or devices capable of storing executable codes and data that can be accessed by the processor (e.g., via a bus). The memory 204 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 204 can be distributed across multiple machines or devices, such as in the case of a network-based memory or cloud-based memory. The memory 204 can include data (not shown), an operating system (not shown), and an application (not shown). The data can include any data for processing (e.g., an audio stream, a video stream, a multimedia stream, user commands, and/or other data). The application can include programs that permit the processor 202 to implement instructions to generate control signals for performing functions of the techniques in the following description.

In some implementations, in addition to the processor 202 and the memory 204, the computing device 200 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the computing device 200 or can be a shared device accessible via a network. In some implementations, the application in the memory 204 can be stored in whole or in part in the secondary storage device and loaded into the memory 204 as needed for processing.

In addition to the processor 202 and the memory 204, the computing device 200 can include input/output (I/O) devices. For example, the computing device 200 can include an I/O device 206. The I/O device 206 can be implemented in various ways, for example, it can be a display that can be coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 206 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 206 is a display, for example, it can be a liquid crystal display (LCD), a cathode-ray tube (CRT), or any other output device capable of providing a visual output to an individual. In some cases, an output device can also function as an input device. For example, the output device can be a touchscreen display configured to receive touch-based input.

The I/O device 206 can alternatively or additionally be formed of a communication device for transmitting signals and/or data. For example, the I/O device 206 can include a wired means for transmitting signals or data from the computing device 200 to another device. For another example, the I/O device 206 can include a wireless transmitter or receiver using a protocol compatible to transmit signals from the computing device 200 to another device or to receive signals from another device to the computing device 200.

In addition to the processor 202 and the memory 204, the computing device 200 can optionally include a communication device 208 to communicate with another device. Optionally, the communication can be via a network. The network can be one or more communications networks of any suitable type in any combination, including, but not limited to, networks using Bluetooth communications, infrared communications, near-field communications (NFCs), wireless networks, wired networks, local area networks (LANs), wide area networks (WANs), virtual private networks (VPNs), cellular data networks, or the Internet. The communication device 208 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the computing device 200 to provide functions of communication with the network.

The computing device 200 can also include or be in communication with an image-sensing device (not shown), for example a camera, or any other image-sensing device now existing or hereafter developed that can sense an image such as the image of a user operating the computing device 200 or a view of a monitored environment. The image-sensing device can be positioned such that it is directed to capture a view of the monitored environment. For example, the image-sensing device can be directed toward a patient and/or a patient bed in a hospital room. In an example, the position and optical axis of the image-sensing device can be configured and/or controlled such that the field of vision (i.e., the view) includes an area of interest.

The computing device 200 can also include or be in communication with a sound-sensing device, for example a microphone, or any other sound-sensing device now existing or hereafter developed that can sense sounds near the computing device 200. The sound-sensing device can be positioned or controlled to be positioned such that it is directed toward a monitored environment so as to capture speech, other utterances, or other sounds within the monitored environment. The sound-sensing device can be configured to receive sounds, for example, speech or other utterances made by the user while the user operates the computing device 200. The computing device 200 can also include or be in communication with a sound playing device.

The computing device 200 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably.

Figure 3:
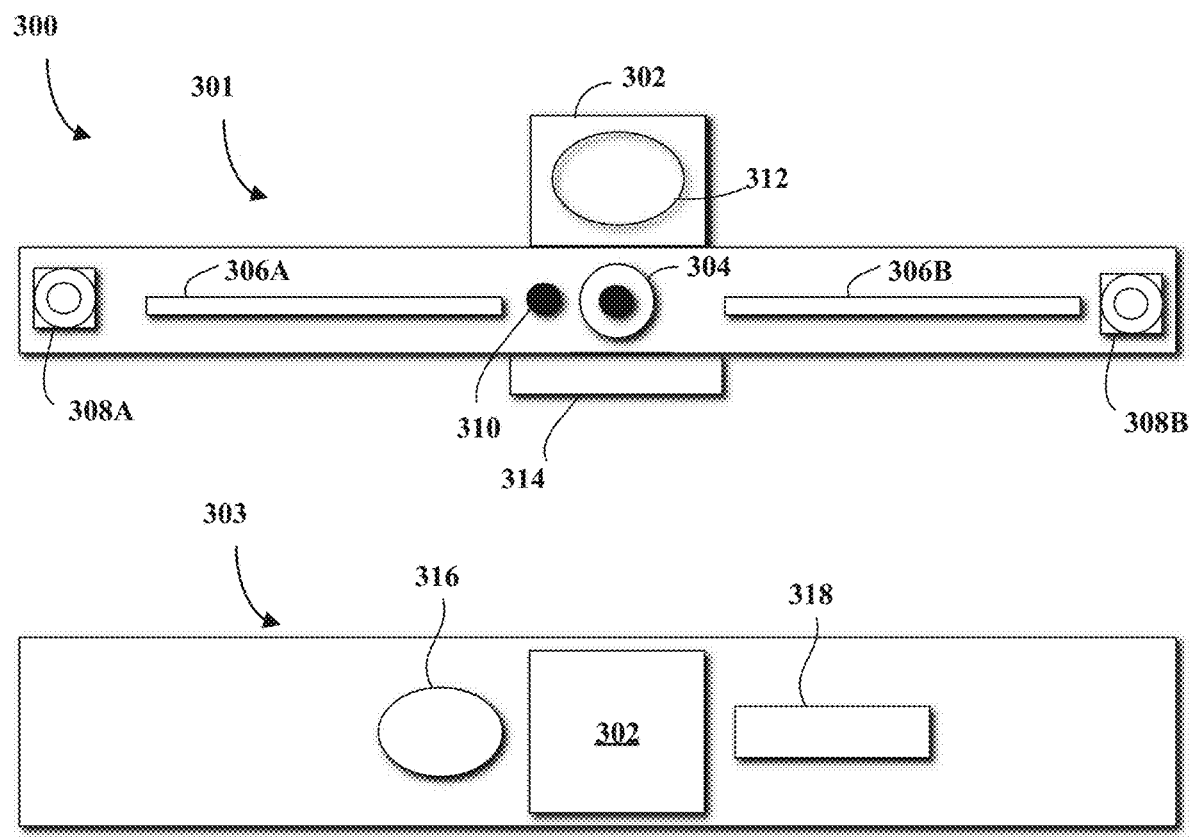
FIG. 3 is a block diagram of an example of a monitoring device according to implementations of this disclosure.

FIG. 3 is a block diagram of an example of a monitoring device 300 according to implementations of this disclosure. The monitoring device 300 can be the monitoring device 104 of FIG. 1. FIG. 3 shows a front view 301 and a top view 303 of the monitoring device 300. The front view 301 faces the monitored environment. The monitoring device 300 includes a camera 302, a fish-eye camera 304, microphone arrays 306A, 306B, infra-red light sensors 308A, 308B, a light sensor 310, a multi-color LED strip 312, a mounting device (i.e., a mount 314), a speaker 316, and a control panel 318. However, a monitoring device according to this disclosure is not so limited and can include fewer, additional, other sensors and/or components, or a combination thereof. While not specifically shown, the monitoring device 300 can also include a processor, as described with respect to the processor 202 of FIG. 2. The monitoring device 300 can also include a memory, such as the memory 204 if FIG. 2.

The camera 302 can be used to view the monitored environment. The camera 302 can include pan, tilt, zoom capabilities so that a remote user, via a user device, such as the user device 106 of FIG. 1, can control the camera 302 to pan, tilt, and/or zoom (PTZ) in order to adjust the view of the monitored environment to a desired view. That is, the monitoring device 300 can receive PTZ commands from the user device. The camera 302 can be capable of a magnification zoom factor of 10×, 12×, 20×, or some other magnification zoom factor. The fish-eye camera 304 can provide a 180° view of the monitored environment.

The microphone arrays 306A, 306B can be used to capture sounds in the monitored environment. The infra-red light sensors 308A, 308B can be used to improve viewing of the monitored environment, such as the monitoring device 104, under low light conditions, such as at night.

The light sensor 310 can be used to sense the ambient light present in the monitored environment. In an example, the amount of detected ambient light can be used to adjust an intensity of a display that may connected to the monitoring device 300. The multi-color LED strip 312 can be used to give a visual indication to an occupant of the monitored environment of an incoming video and/or audio call, that a video and/or audio call is ongoing, or that a video and/or audio call is not active. The multi-color LED strip 312 can be used to provide other visual indicators to the occupant of the monitored environment.

The mount 314 can be used to mount the monitoring device on top of a monitor or a television. In an example, the monitor can be a portable computing device, such as a tablet. In an example, the monitoring device 300 may not itself include a processor. However, via an external connection (shot shown), such as a USB connection, a firewire connection, a Bluetooth connection, or the like, can be connected to a general purpose computer to enable the general purpose computer to perform monitoring functions of the monitored environment. As such, by connecting the monitoring device 300 to any processing unit, the processing unit can be turned into a telehealth end point.

The speaker 316 can be used to output sounds (e.g., voice, speech, etc.), such as those received from a user device, such as the user device 106 of FIG. 1. The control panel 318 can include controls for muting, unmuting, and controlling the volume of the speaker 316. The control panel 318 can also include controls for controlling whether the camera 302 is enabled or disabled. When the camera 302 is disabled, the camera 302 does not visually (via video or images) capture (e.g., view) the monitored environment.

Figure 4:
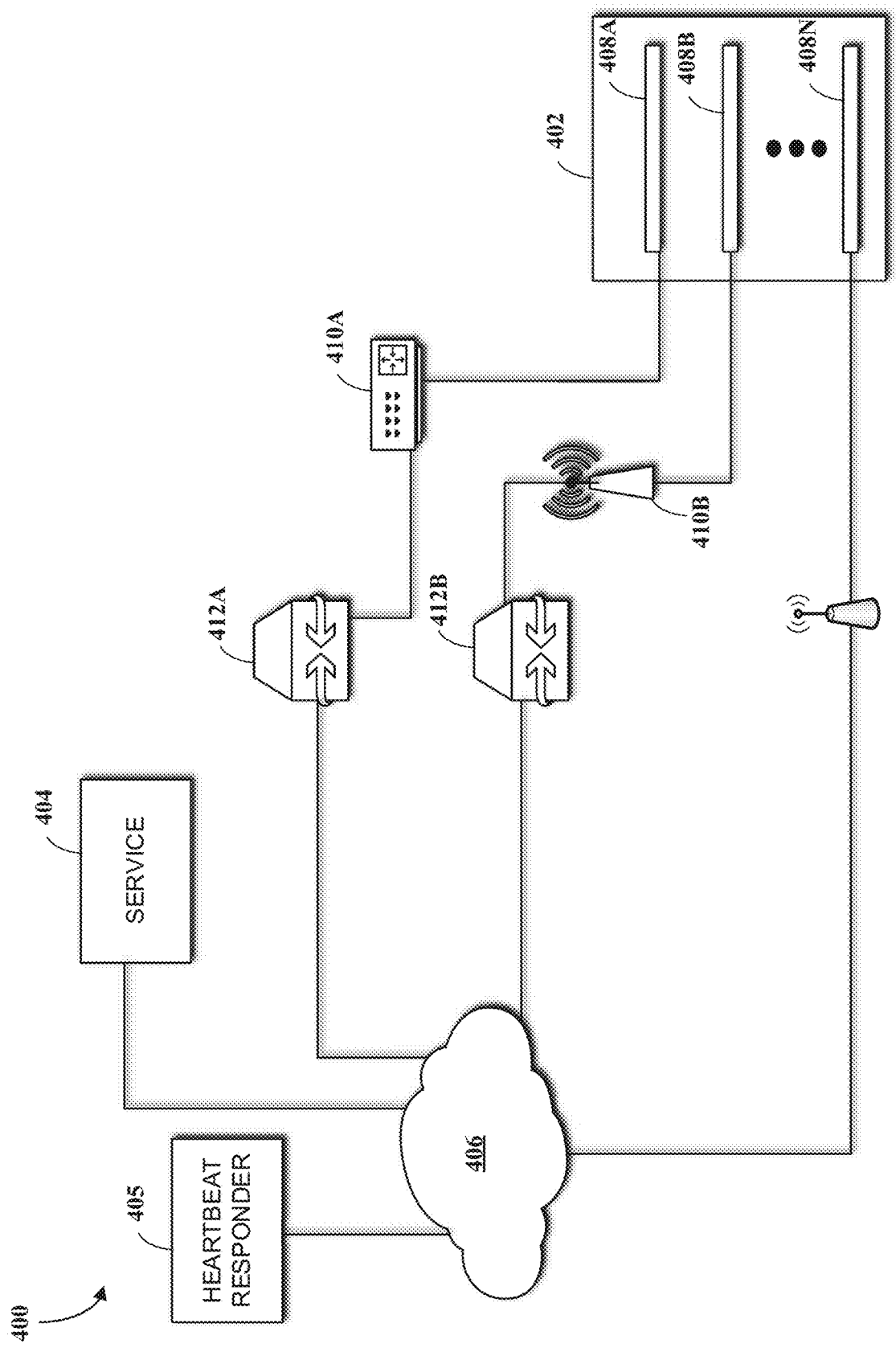
FIG. 4 is a diagram of an example of connecting a monitoring device to a service according to implementations of this disclosure.

FIG. 4 is a diagram of an example 400 of connecting a monitoring device to a service according to implementations of this disclosure. The example 400 includes a monitoring device 402, a service provider 404, and a heartbeat responder 405. The monitoring device 402 is in communication with the service provider 404 and the heartbeat responder 405 via a network 406.

The monitoring device 402 can be the monitoring device 104 of FIG. 1. The monitoring device can be, or can be similar to, the computing device 200 of FIG. 2. The monitoring device can be, or can be similar to the monitoring device 300 of FIG. 3. The service provider 404 can be the server 108 of FIG. 1. For example, the service provider 404 can be a real-time communication service that allows a user device, such as the user device 106 of FIG. 1, to connect with the monitoring device 402. For example, a physician can use a user device to conduct a tele-medicine video session with a patient who is monitored by the monitoring device 402.

The heartbeat responder 405 is used by the monitoring device 402 to ensure that the monitoring device 402 is connected to the network 406. More specifically, the heartbeat responder 405 can be used by the monitoring device 402 to validate that the monitoring device 402 can communicate with other devices and/or services via the network 406. In an example, the heartbeat responder 405 can be a module of, or can be included in, the service provider 404. The monitoring device can send heartbeat requests (e.g., ping requests) to the heartbeat responder 405 to ensure that the monitoring device 402 is capable of reaching services over the network 406 and/or that services over the network 406 can reach the monitoring device 402.

The monitoring device 402 can include a plurality of network interfaces (e.g., network interfaces 408A-408N). As is known, a network interface enables a device (such as a computer) to connect to a computer network. The monitoring device 402 includes two or more network interfaces. The network interfaces 408 include a first network interface (e.g., the network interface 408A) that is the currently enabled network interface for connecting the monitoring device 402 to the service provider 404. The network interfaces 408 include secondary network interfaces (e.g., the network interfaces 408B-408N) that are currently inactive interfaces for connecting the monitoring device 402 to the service provider 404. When the monitoring device 402 sends information to, or receives information from, the service provider 404, such information is sent and received via the currently enabled network interface. Secondary network interfaces that are currently inactive interfaces do not participate in the sending and receiving of the information.

The monitoring device 402 may be connected via multiple layers of routers, gateways, and the like to the network 406. For example, the network interface 408A is shown as being wiredly connected via an ethernet port to a router 410A. For example, the network interface 408B is shown as being wirelessly connected to a wireless router 410B. The router 410A and the wireless router 410B are shown as being connected to a gateway 412A and a gateway 412B, respectively. The gateways 412A, 412B are connected directly to the network 406.

The network topology of the example 400 is a mere illustration of possible network topologies, as a person skilled in the art can appreciate, and the disclosure herein is not limited in any way by the topology of the example 400. The essential part is that the monitoring device 402 includes a plurality of network interfaces 408 each providing a different possible network path to connect to the network 406, which in turn means that the monitoring device 402 has several network paths to reach and/or be reached from the service provider 404. The monitoring device 402 may, for example, include one or more network interfaces for connecting to the network 406 via one or more of a digital subscriber line (DSL), a cellular service, Worldwide Interoperability for Microwave Access (WiMAX), satellite, and/or the like.

Figure 5:
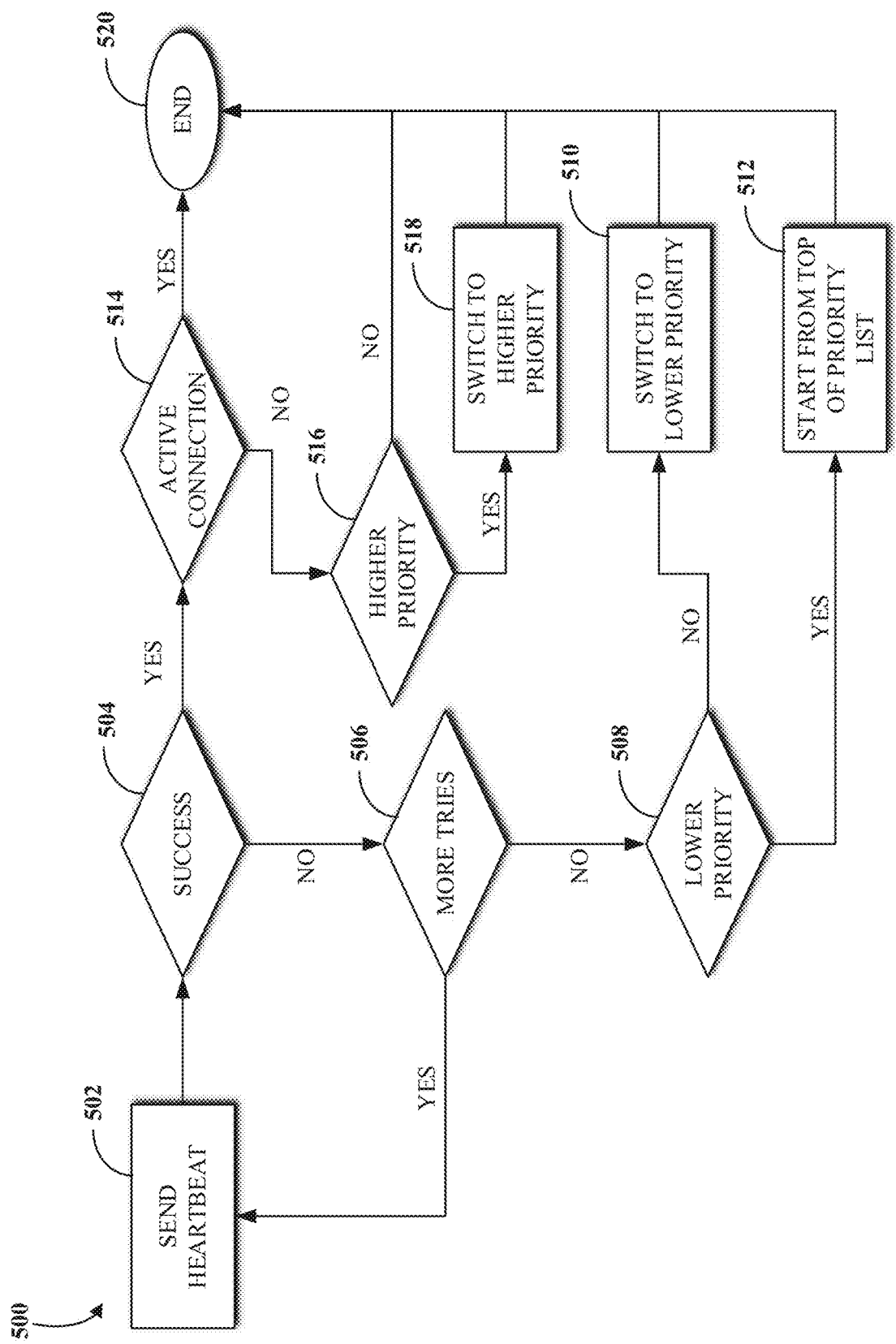
FIG. 5 is an example of a technique for network switching by a device according to implementations of this disclosure.

FIG. 5 is an example of a technique 500 for network switching by a device according to implementations of this disclosure. The technique 500 can be executed to ensure that the device can always (or nearly always) reach or be reached from a service provider or a user device, such as the user device 106 of FIG. 1. The technique 500 can be executed to ensure that the device can always reach or be reached using the most optimal network path. The technique 500 can be executed in a control loop. For example, the technique 500 can be executed every 100 milliseconds, 500 milliseconds, 1 second, 5 seconds, or at some other frequency.

The technique 500 can be implemented by a monitoring device, such as the monitoring device 104 of FIG. 1, the monitoring device 300 of FIG. 3, or the monitoring device 402 of FIG. 4. The technique 500 can be implemented by a computing device, such as the computing device 200 of FIG. 2. The technique 500 can be implemented as computer instructions that may be stored in a memory, such as the memory 204 of FIG. 2. The computer instructions can be executed by a processor, such as the processor 202 of FIG. 2. As mentioned above, the monitoring device may not itself include a processor but may be connected to the processor. Thus, the technique 500 can be implemented by the processor to which the monitoring device is connected.

As described with respect to the monitoring device 402 of FIG. 4, the device can include a plurality of network interfaces. At the start of the technique 500, a first network interface of the plurality of network interfaces is a currently enabled network interface for connecting the device to a service (or, equivalently, to the network 406 of FIG. 4). Other, secondary network interfaces of the device are currently inactive interfaces for connecting the device to the service. The secondary network interfaces are the plurality of network interfaces excluding the first network interface. In an example, a priority (e.g., sequence, etc.) order can be assigned to (e.g., associated with, etc.) each network interface of the plurality of network interfaces.

At 502, the device sends a heartbeat request. The heartbeat request can be a ping request that is sent to a heartbeat responder. In an example, the heartbeat responder can be any publicly available host. For example, the publicly available host can be google-public-dns-a.google.com, google-public-dns-b.google.com, ns1.telstra.net, or the like. In an example, the heartbeat responder can be a dedicated heartbeat responder. For example, the heartbeat responder can be, or can be a part of, a service provider via which users (e.g., a physician, a family member, etc.) can connect to the device.

At 504, if the technique 500 receives a response to the heartbeat request, then the technique 500 proceeds to 514; otherwise the technique 500 proceeds to 506. Receiving a response to the heartbeat request indicates that the device is connected to the network 406 and not merely that the device is connected to intermediate gateway, router, or the like.

In the case that no response is received for the heartbeat request, the technique 500 may be configured to resend the heartbeat request a predetermined number of times (e.g., 2, 3, 4, or some other number of times). The heartbeat request can be resent to ensure that a response was not received due to transient network errors. In an example, to mitigate against the heartbeat responder itself not being available, as opposed to a network connection problem between the device (e.g., the monitoring device 402 of FIG. 2) and the network (e.g., the network 406 of FIG. 2), at least some of the subsequent heartbeat requests can be sent to different heartbeat responders.

If no response is received to the heartbeat request at 504 and there are no more tries remaining, the technique 500 proceeds to 508.

At 508, the technique 500 determines whether there is a lower priority network interface than the currently enabled network interface. For example, if the currently enabled network interface has a priority α, then the technique 500 determines whether there is a second network interface of the plurality of network interfaces having a priority β, where the priority β is considered to be a lower priority than the priority α. If there is such a second network interface, then the technique 500 proceeds to 512; otherwise, the technique 500 proceeds to 510.

At 510, the technique 500 sets the second network interface of the secondary network interfaces as the currently enabled network interface for connecting the device to the service. On the other hand, if there is no network interface with a lower priority than the first network interface, then, at 512, the technique 500 sets the top priority network interface as the currently enabled network interface. From 510 or 512 the technique 500 ends the current iteration (e.g., invocation, etc.) of the technique 500 at 520.

As such, the second network interface that is set as a currently enabled network interface can be one of a lower priority network interface than the first network interface or the network interface having the highest priority amongst the plurality of network interfaces. However, other ways of selecting a second network interface as the currently enabled network interface are possible when the test at 506 is negative.

In an example, regardless of the priority of the first network interface, the second interface can be the highest priority network interface unless the first network interface is itself the one with the highest priority. In an example, the second interface can be randomly selected from amongst the plurality of network interfaces excluding the first network interface. In an example, a respective status can be associated with each of the network interfaces of the plurality of network interfaces. The status can indicate a last enabled time of the network interface. If the last enabled time of an interface is less than a threshold amount of time (e.g., 1 second, 5 seconds, or some other amount of time), then the network interface is not selected as the second network interface. That is, if the network interface was set (e.g., selected, enabled, etc.) as the currently enabled network interface within the threshold amount of time, then it is not selected again as the currently enabled network interface. This can avoid the situation where the technique 500 sets a network interface as the currently enable network interface when it was recently determined that the device cannot reach the network 406 via that network interface.

To illustrate using FIG. 4, the first network interface can be the network interface 408A. The monitoring device 402 sends a heartbeat request (e.g., a predetermined number of heartbeat requests) to heartbeat responder 405 (or one or more heartbeat responders). However, the monitoring device 402 does not receive a response. This may be due to a connectivity problem between the router 410A and the gateway 412A, a connectivity problem between the gateway 412A and the network 406, or an equipment failure of one of the router 410A and/or the gateway 412A. Thus, the technique 500 can set the network interface 408B as the currently enabled network interface for connecting the monitoring device 402 to the service provider 404. As the technique 500 is executed repeatedly, in a next iteration, the technique 500 determines whether the monitoring device 402 can reach the service provider 404, or has connectivity to the network 406, by sending heartbeat requests to the heartbeat responder via the network interface 408B, as described above. And so on.

Returning again to FIG. 5. If the technique 500 receives a response to the heartbeat request at 504, in some implementations, the technique 500 may attempt to configure the device to use a higher priority network interface than the currently enabled network interface, as further described below with respect to 514-518. The higher priority network interface may be such that it connects the device to the network 406 using a higher bandwidth network, a less costly network, a more stable network, some other criterion for setting network interface priorities, or a combination thereof.

At 514, the technique 500 determines whether the device is currently in an active connection session with the service. In an example, an active connection session can be such that switching from one network interface to another can cause a loss of the connection (e.g., a termination of the service). For example, when the active network interface of the device is changed, the device may be assigned a new IP address. The other end of the connection (e.g., the service) may not be able to continue the active connection session based on the new IP address of the device. In an example, an active connection session can be such that switching from one network interface to another can cause an unacceptable or intolerable temporary loss of the connection. For example, a physician may be currently connected to the monitoring device 402 to respond to and diagnose an emergency patient condition who is being monitored by the monitoring device 402. Any interruption to the connection, whether temporary or permanent, can have fatal consequences to the patient.

Thus, if at 514 the device is currently in an active connection session, the technique 500 terminates at 520. On the other hand, if the device is not currently in an active connection session, then the technique 500 proceeds to 516. At 516, the technique 500 determines whether the secondary network interfaces include a higher priority network interface than the currently enable network interface. For example, the technique 500 determines whether the first network interface (i.e., the currently enabled network interface) is the highest priority network interface. If so, then the technique 500 ends at 520.

If the first network interface is not the highest priority network interface, then the technique 500 proceeds to 516 to switch to a higher priority network interface; the technique 500 then ends at 520. In an example, the technique 500 switches to the next higher priority network interface. In an example, the technique 500 switches to the highest priority network interface.

As eluded to above, a status can be associated with a network interface. Thus, when the technique 500 switches to a second network interface, such as at 510, 512, or 518, the technique 500 can associate with the second network interface a timestamp indicating the current time that the second network interface was enabled as the currently active network interface.

Figure 6:
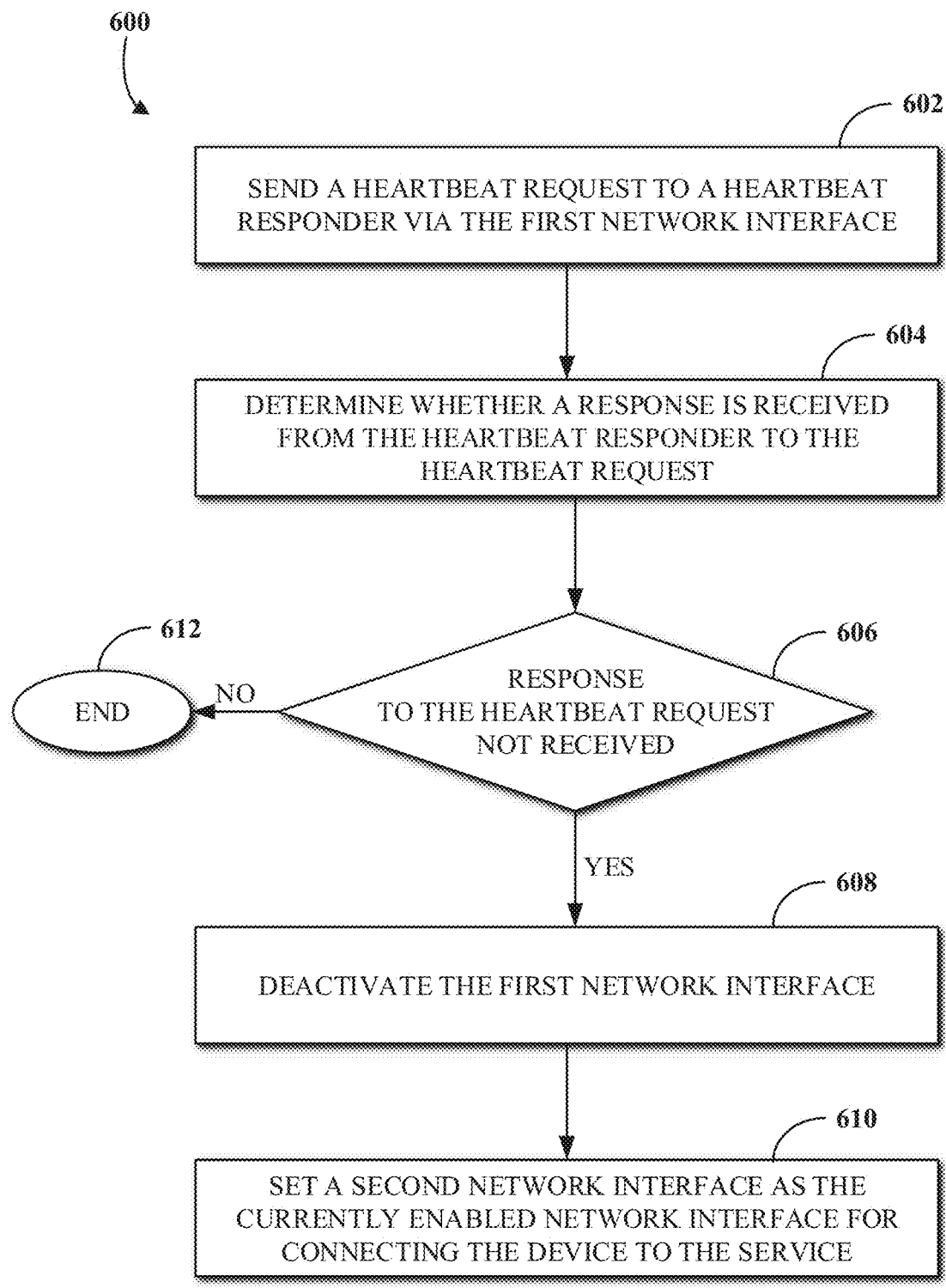
FIG. 6 is an example of a technique for managing connectivity of a device to a service according to implementations of this disclosure.

FIG. 6 is an example of a technique 600 for managing connectivity of a device to a service according to implementations of this disclosure. The technique 600 can be executed to ensure that the device can always reach or be reached from a service provider or a user device, such as the user device 106 of FIG. 1. The technique 600 can be executed to ensure that the device can always reach or be reached using the most optimal network path. The technique 600 can be executed in a control loop. For example, the technique 600 can be executed every 100 milliseconds, 500 milliseconds, 1 second, 5 seconds, or at some other frequency.

The technique 600 can be implemented by a monitoring device, such as the monitoring device 104 of FIG. 1, the monitoring device 300 of FIG. 3, or the monitoring device 402 of FIG. 4. The technique 600 can be implemented by a computing device, such as the computing device 200 of FIG. 2. The technique 600 can be implemented as computer instructions that may be stored in a memory, such as the memory 204 of FIG. 2. The computer instructions can be executed by a processor, such as the processor 202 of FIG. 2. As mentioned above, the monitoring device may not itself include a processor but may be connected to the processor. Thus, the technique 600 can be implemented by the processor to which the monitoring device is connected.

The device can include a plurality of network interfaces. The plurality of network interfaces include a first network interface and secondary network interfaces. The first network interface is a currently enabled network interface for connecting the device to the service. The secondary network interfaces are currently inactive interfaces for connecting the device to the service.

At 602, the technique 600 sends a heartbeat request to a heartbeat responder via the first network interface. The heartbeat request can be sent as described above with respect to 502 of FIG. 5. In an example, and as described with respect to 504 and 506 of FIG. 5, the heartbeat request can be sent up to a predetermined number of times. In an example, the predetermined number of times can be 3. Thus, a first heartbeat request can be sent at 502 and up to two more retries can be sent, such as described with respect to 504-506 of FIG. 5.

At 604, the technique 600 determines whether a response is received from the heartbeat responder to the heartbeat request, such as described with respect to 504 of FIG. 5. If a response to the heartbeat request is determined to not have been received at 606, the technique 600 proceeds to 608. At 608, the technique 600 deactivates the first network interface as the currently enabled network interface; and, at 610, the technique 600 sets a second network interface of the secondary network interfaces as the currently enabled network interface for connecting the device to the service.

In an example, and as described above, the plurality of the network interfaces can be ordered in a priority order. As such, in an example, setting the second network interface of the secondary network interfaces as the currently enabled network interface can include select the second network interface based on the priority order. In an example, selecting the second interface based on the priority order can include, on a first condition that the first network interface is not of a lowest priority order, selecting the second network interface having a next lowest priority order from the first network interface; and, on a second condition that the first network interface is of the lowest priority order, selecting the second network interface having the highest priority order.

If a response to the heartbeat request is determined to have been received at 606, the technique 600 can end at 612.

In another example, if the response to the heartbeat request was determined to have been received at 606, the technique 600 can attempt to configure the device to use a different (e.g., a more preferred, etc.) network interface of the secondary network interfaces, which can provide a more optimal connection to the service. Thus, in an example, in response to determining that the response to the heartbeat request was received, the technique 600 can determine whether the device is currently connected to the service, as described with respect to 514 of FIG. 5. In response to determining that the device is not connected to the service and that the first network interface is not of a highest priority network interface, the technique 600 can set a third network interface of the secondary network interfaces as the currently enabled network interface for connecting the device to the service where the third network interface can have a highest priority order.

In an example, setting the second network interface of the secondary network interfaces as the currently enabled network interface for connecting the device to the service can include associating, with the second network interface, a timestamp indicating a time of setting the second network interface as the currently enabled network interface.

For simplicity of explanation, the techniques 400 and 500 of FIGS. 4 and 5, respectively, are depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the monitoring device 300, and/or any of the components therein described with respect to FIG. 3 (and the techniques, algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, the monitoring device 300 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device, comprising:
   a processor; and
   a plurality of network interfaces, comprising a first network interface and secondary network interfaces,
      wherein the first network interface is a currently enabled network interface for connecting the device to a service,
      wherein each of the secondary network interfaces is a currently inactive network interface for connecting the device to the service, and
      wherein the processor configured to:
         send a heartbeat request to a heartbeat responder via the first network interface;
         determine whether a response is received from the heartbeat responder to the heartbeat request; and
         in response to determining that the response to the heartbeat request was not received:
            deactivate the first network interface; and
            set a second network interface of the secondary network interfaces as the currently enabled network interface for connecting the device to the service.

2. The device of claim 1, wherein the plurality of the network interfaces are ordered in a priority order.

3. The device of claim 2, wherein to set the second network interface of the secondary network interfaces as the currently enabled network interface comprises to:
   select the second network interface based on the priority order.

4. The device of claim 2, wherein to select the second network interface based on the priority order comprises to:
   on a first condition that the first network interface is not of a lowest priority order, select the second network interface having a next lowest priority order from the first network interface; and
   on a second condition that the first network interface is of the lowest priority order, select the second network interface having a highest priority order.

5. The device of claim 1, wherein the processor is further configured to:
   in response to determining that the response to the heartbeat request was received, determine whether the device is currently connected to the service; and
   in response to determining that the device is not connected to the service and that the first network interface is not of a highest priority network interface,
      set a third network interface of the secondary network interfaces as the currently enabled network interface for connecting the device to the service, wherein the third network interface has a highest priority order.

6. The device of claim 1, wherein to send the heartbeat request to the heartbeat responder via the first network interface comprises to:
   send the heartbeat request a predetermined number of times.

7. The device of claim 6, wherein the predetermined number of times is 3.

8. The device of claim 1, wherein to set the second network interface of the secondary network interfaces as the currently enabled network interface for connecting the device to the service comprises to:
   associate, with the second network interface, a timestamp indicating a time of setting the second network interface as the currently enabled network interface.

9. A method for connecting a device to a service, comprising:
   sending a heartbeat request to a heartbeat responder via a first network interface of the device,
      wherein the device includes a plurality of network interfaces comprising the first network interface and secondary network interfaces,
      wherein the first network interface is a currently enabled network interface for connecting the device to the service, and
      wherein each of the secondary network interfaces is a currently inactive network interface for connecting the device to the service;
   determining whether a response is received from the heartbeat responder to the heartbeat request; and
   in response to determining that the response to the heartbeat request was not received, setting a second network interface of the secondary network interfaces as the currently enabled network interface for connecting the device to the service.

10. The method of claim 9, wherein the plurality of the network interfaces are ordered in a priority order.

11. The method of claim 10, wherein setting the second network interface of the secondary network interfaces as the currently enabled network interface comprises:
    selecting the second network interface based on the priority order.

12. The method of claim 10, wherein selecting the second network interface based on the priority order comprises:
    on a first condition that the first network interface is not of a lowest priority order, selecting the second network interface having a next lowest priority order from the first network interface.

13. The method of claim 10, wherein selecting the second network interface based on the priority order comprises:
    on a second condition that the first network interface is of a lowest priority order, selecting the second network interface having a highest priority order.

14. The method of claim 9, further comprising:
in response to determining that the response to the heartbeat request was received, determining whether the device is currently connected to the service; and
in response to determining that the device is not connected to the service and that the first network interface is not of a highest priority network interface,
setting a third network interface of the secondary network interfaces as the currently enabled network interface for connecting the device to the service, wherein the third network interface has a highest priority order.

15. The method of claim 9, wherein sending the heartbeat request to the heartbeat responder via the first network interface comprises:
sending the heartbeat request a predetermined number of times.

16. The method of claim 9, wherein setting the second network interface of the secondary network interfaces as the currently enabled network interface for connecting the device to the service comprises:
associating, with the second network interface, a timestamp indicating a time of setting the second network interface as the currently enabled network interface.

17. A non-transitory computer-readable storage medium, comprising executable instructions that, when executed by a processor, facilitate performance of operations, comprising:
sending a heartbeat request to a heartbeat responder via a first network interface of a device,
wherein the device includes a plurality of network interfaces comprising the first network interface and secondary network interfaces,
wherein the first network interface is a currently enabled network interface for connecting the device to a service, and
wherein each of the secondary network interfaces is a currently inactive network interface for connecting the device to the service;
determining whether a response is received from the heartbeat responder to the heartbeat request; and
in response to determining that the response to the heartbeat request was not received, setting a second network interface of the secondary network interfaces as the currently enabled network interface for connecting the device to the service.

18. The non-transitory computer-readable storage medium of claim 17, wherein the plurality of the network interfaces are ordered in a priority order, and wherein setting the second network interface of the secondary network interfaces as the currently enabled network interface comprises:
selecting the second network interface based on the priority order.

19. The non-transitory computer-readable storage medium of claim 18, wherein selecting the second network interface based on the priority order comprises:
on a first condition that the first network interface is not of a lowest priority order, selecting the second network interface having a next lowest priority order from the first network interface; and
on a second condition that the first network interface is of the lowest priority order, selecting the second network interface having a highest priority order.

20. The non-transitory computer-readable storage medium of claim 17, wherein the operations further comprising:
in response to determining that the response to the heartbeat request was received, determining whether the device is currently connected to the service; and
in response to determining that the device is not connected to the service and that the first network interface is not of a highest priority network interface,
setting a third network interface of the secondary network interfaces as the currently enabled network interface for connecting the device to the service, wherein the third network interface has a highest priority order.

* * * * *